(No Model.)

E. W. ROSS.
EXTENSIBLE UNIVERSAL JOINT FOR SHAFTS.

No. 254,843. Patented Mar. 14, 1882.

Witnesses.
F. L. Ourand
R. M. Smith

Inventor.
Elmore W. Ross
by A. M. Smith
Attorney

UNITED STATES PATENT OFFICE.

ELMORE W. ROSS, OF FULTON, NEW YORK.

EXTENSIBLE UNIVERSAL JOINT FOR SHAFTS.

SPECIFICATION forming part of Letters Patent No. 254,843, dated March 14, 1882.

Application filed January 27, 1882. (No model.)

*To all whom it may concern:*

Be it known that I, ELMORE W. ROSS, of Fulton, county of Oswego, State of New York, have invented new and useful Improvements in Extensible Tumbling-Joints for Shafts, of which the following is a full, clear, and exact description, reference being had to the accompanying drawings, making part of this specification, in which—

Figure 1:
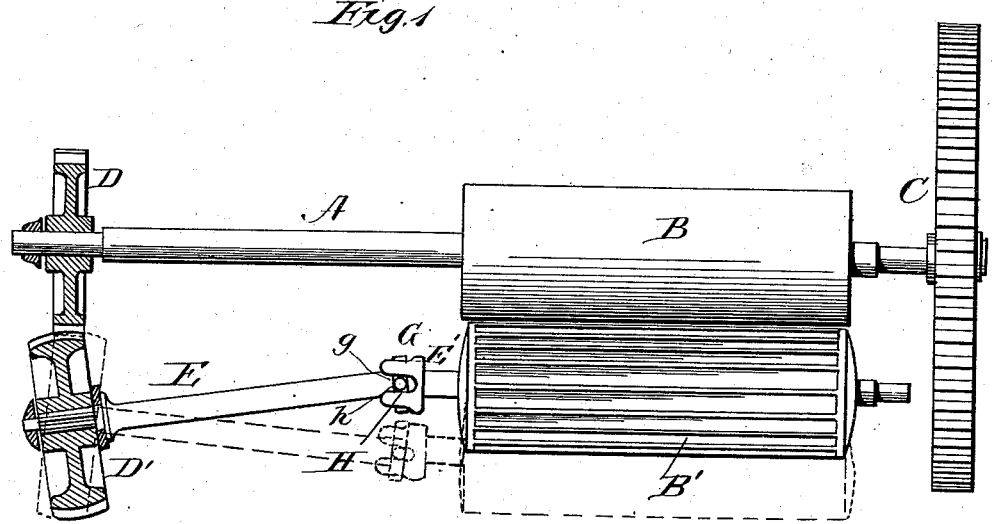
Figure 2:
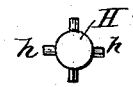
Figure 3:
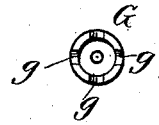

Figure 1 is a side elevation of my improved extensible tumbling-joint for shafts, shown applied in connection with feed-rolls and the gears for actuating the same. Fig. 2 is an end view of the slotted cylindrical head on one portion of the jointed shaft, and Fig. 3 is a similar view of the other part of the extensible joint applied to or formed upon the other portion of the shaft.

My invention relates to a novel construction of tumbling or universal joints for shafting, whereby said joint is made extensible for the purpose of compensating for any variations in the position or distance apart of the driving-gears and the mechanism operated therefrom through the tumbling-shaft, and is particularly designed for use in agricultural and fiber-cutting machines employing a yielding feed-roller to accommodate the varying thickness of the material operated upon or being fed to the cutters through the agency of said roller; and I have therefore in the accompanying drawings shown the joint or coupling applied in connection with such feed-roller, though it will be obvious that it may be used wherever a tumbling-joint is required for coupling the two parts of a jointed shaft.

The invention consists in the employment of a hollow and slotted cylindrical head upon one portion of the jointed shaft, and a hub or collar provided with radial spurs or pins on the connecting end of the other portion of the shaft, said pins in one portion engaging with and sliding in the slots of the cylindrical head for actuating or being actuated thereby, and for permitting relative endwise movements of the two parts of the jointed shaft, as will be explained.

In the drawings, A represents a driving shaft of a cutting-machine designed to be mounted in fixed bearings in the frame thereof, and carrying a smooth feed-roller, B.

C is a spur-gear for imparting motion received from any convenient driving-power to said shaft. On the opposite end of the shaft A from that carrying wheel C is another gear-wheel, D, which engages with and drives a gear, D', on one end of the tumbling or jointed shaft E E', carrying the yielding feed-roller B', the portion E' of the shaft carrying said roller being in practice mounted in slotted cheek-plates, adapting said roller to move away from a position in contact with the roller B as far as may be necessary to accommodate the varying thickness of the material operated upon or fed forward by said rollers. The gear D in practice by preference is also made convex-faced, as shown, and mounted in a swiveling yoke having a pivot at right angles to the shaft E E', this arrangement permitting the gear to vibrate, as indicated by dotted lines, for maintaining its relation to the jointed shaft which it drives, at the same time preventing the cramping of the gears in a manner fully set forth in another application for a patent in agricultural and fiber-cutting machines, and which therefore need not be further described here.

The coupling for connecting the two parts of shaft E E' is as follows: G is a hollow cylindrical head secured to one portion of said shaft, and H is a short hub or collar formed upon or secured to the adjoining end of the other portion of the shaft. The cylindrical head G is provided with longitudinal slots *g*, extending from near the closed end, secured to shaft E', to its outer end, as shown, said slots having parallel side walls, except just at their outer ends, where they are by preference made to diverge, being rounded, as shown, and the hub or collar H is provided with radial pins or spurs *h*, which penetrate the cylinder G, passing through the slots *g*, as shown in Fig. 1. By this construction and arrangement it will be seen that the part H is not only adapted to drive the part G or vice versa, and to permit the vibration or deflection of the two parts of the shaft from a right line, but a longitudinal relative movement of said part is provided for within the joint or coupling uniting them, the part H being adapted to slide in and out in the part G.

Thus a very cheap, simple, and durable extensible tumbling-joint is provided, one which has been found very effective in practice, and which does away with the more expensive constructions of tumbling-joints with telescopic or sliding shafts requiring accurate fitting and adjustments heretofore employed. The round pins work easily in the slots and permit entire freedom of relative movement of the two parts of the shaft within the required limits.

Having now described my invention, I claim as new—

1. The two parts of a jointed tumbling-shaft, provided one with a slotted cylindrical head and the other with a hub or collar having rigid radial pins passing through the slots of said head, and forming in connection therewith an extensible universal joint, substantially as described.

2. An extensible universal joint for shafting, consisting of the slotted cylindrical head G and the hub or collar H, having rigid radial pins adapted to pass through and to slide in the slots in the cylindrical head, as described.

In testimony whereof I have hereunto set my hand this 9th day of January, A. D. 1882.

ELMORE W. ROSS.

Witnesses:
JAY CLARENCE DOWNER,
CLINTON H. CRONYN.